(12) United States Patent
Kennedy et al.

(10) Patent No.: US 7,708,437 B2
(45) Date of Patent: May 4, 2010

(54) INSTRUMENT PANEL SYSTEM HAVING CONCEALED SWITCHES

(75) Inventors: Karl R. Kennedy, Fraser, MI (US); David Hein, Sterling Heights, MI (US); Christopher D. Spielman, Redford, MI (US); Gregory F. Breakey, St. Clair Shores, MI (US); Thomas J. Fowler, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 1312 days.

(21) Appl. No.: 10/717,078

(22) Filed: Nov. 19, 2003

(65) Prior Publication Data

US 2005/0116818 A1    Jun. 2, 2005

(51) Int. Cl.
*B60Q 1/00* (2006.01)

(52) U.S. Cl. ............ 362/489; 362/488; 362/471

(58) Field of Classification Search .......... 362/471, 362/489, 28, 29, 85, 488; 345/173–178
See application file for complete search history.

(56) References Cited

U.S. PATENT DOCUMENTS

| | | | | |
|---|---|---|---|---|
| 4,529,968 A * | 7/1985 | Hilsum et al. | ............... | 340/635 |
| 5,224,751 A | 7/1993 | Hirashima et al. | | |
| 5,987,793 A * | 11/1999 | Ebine | ............... | 40/580 |
| 6,121,959 A * | 9/2000 | Fukumoto et al. | ............ | 345/173 |
| 6,210,010 B1 * | 4/2001 | Pontetti et al. | ............... | 362/24 |
| 6,234,651 B1 * | 5/2001 | Kodama et al. | ............ | 362/276 |
| 6,247,825 B1 * | 6/2001 | Borkowski | ............... | 362/23 |
| 6,299,320 B1 * | 10/2001 | Kato et al. | ............... | 362/23 |
| 6,508,563 B2 * | 1/2003 | Parker et al. | ............... | 362/29 |
| 6,558,013 B2 * | 5/2003 | Tholin et al. | ............... | 362/29 |
| 6,621,471 B1 * | 9/2003 | Ozaki et al. | ............... | 345/4 |
| 6,652,128 B2 * | 11/2003 | Misaras | ............... | 362/488 |
| 6,717,376 B2 * | 4/2004 | Lys et al. | ............... | 315/292 |
| 6,773,129 B2 * | 8/2004 | Anderson et al. | ............ | 362/84 |
| 6,871,434 B2 * | 3/2005 | Sunaga et al. | ............... | 40/593 |
| 2001/0040562 A1 | 11/2001 | Masudaya | | |
| 2002/0015063 A1 | 2/2002 | Kopitzke et al. | | |
| 2002/0080043 A1 * | 6/2002 | Damiani et al. | ............ | 340/815.4 |
| 2002/0176245 A1 * | 11/2002 | Fuwausa et al. | ............... | 362/84 |

FOREIGN PATENT DOCUMENTS

| | | |
|---|---|---|
| DE | 3836572 A1 | 5/1990 |
| DE | 19807410 A1 | 8/1999 |
| EP | 1442918 A2 | 8/2004 |
| FR | 2570037 A1 | 3/1986 |
| JP | 10053047 A | 2/1998 |

* cited by examiner

*Primary Examiner*—Jacob Y Choi
(74) *Attorney, Agent, or Firm*—Brooks Kushman P.C.

(57) ABSTRACT

An instrument panel system. The instrument panel system provides an aesthetically appealing instrument panel by including a number of concealed switches. The switches are concealed such that an area proximate the switch on the surface of the instrument panel appears to be uninterrupted by the switch. In operation, the position of the switches is revealed by illuminating a switch display.

17 Claims, 4 Drawing Sheets

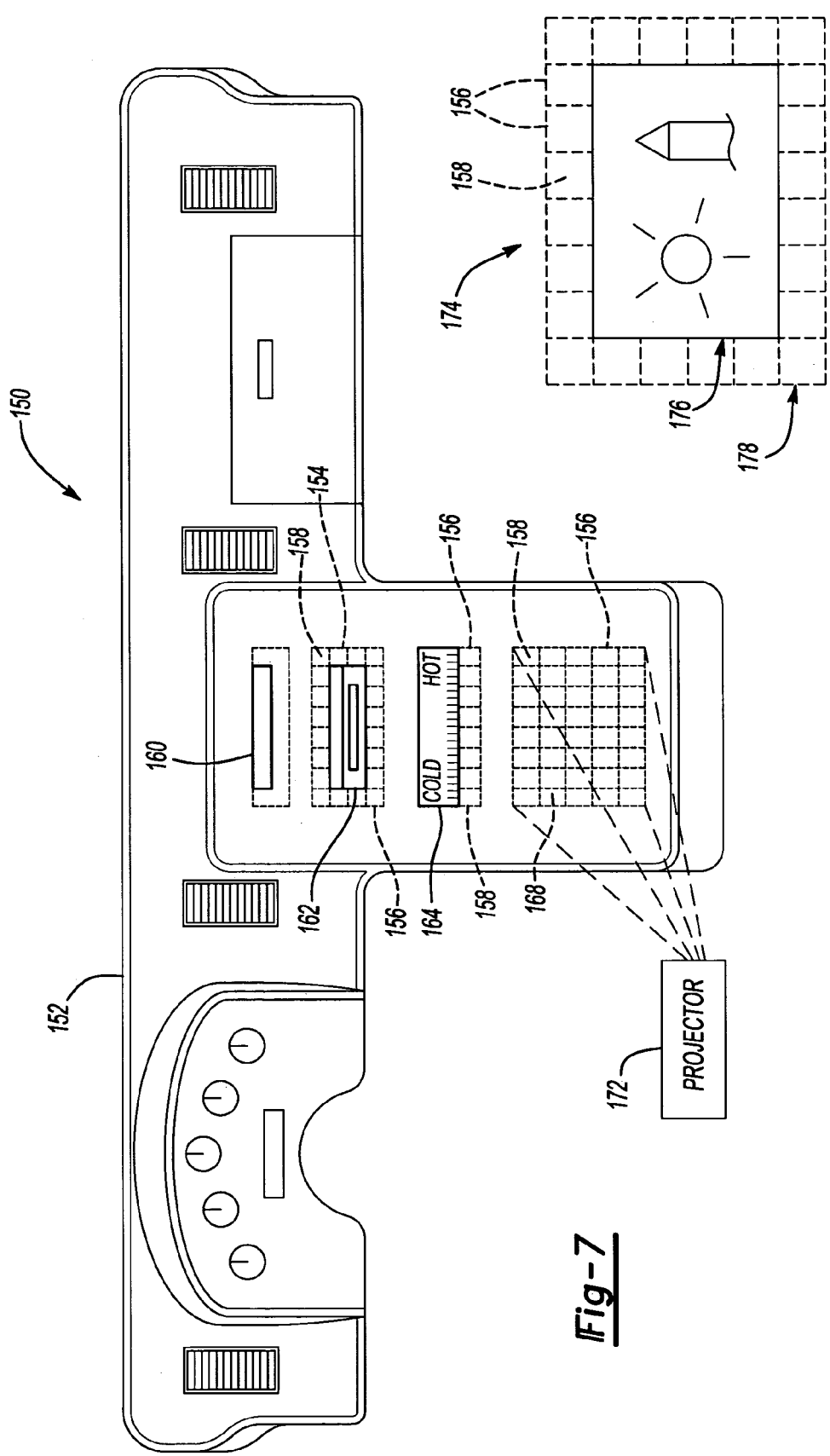

INSTRUMENT PANEL SYSTEM HAVING CONCEALED SWITCHES

BACKGROUND OF THE INVENTION

1. Field of the Invention

The present invention relates to instrument panel systems having a plurality of switches for use by an occupant in a passenger compartment which are visible to the occupant only when illuminated by an illumination source.

2. Background Art

An instrument panel includes a number of switches. In the automotive industry, and in others, the styling of the instrument panel is important to achieving an aesthetically appealing instrument panel.

The switches play an important role in the aesthetic desirability of the instrument panel's appearance. The switches, however, typically include a relief, a bezel, a bracket, or some other fixture or protrusion which tends to interrupt the smoothness of the instrument panel. The interruption is aesthetically undesirable.

The openings required for the switches in the instrument panel also tend to be aesthetically undesirable. Many instrument panels are manufactured from a common instrument panel architecture which standardizes the openings in the instrument panel used to accommodate the switches. Because some of the openings in such standardized instrument panels are not always used, the openings must be filled with blanks or plugs. This is also aesthetically undesirable.

Accordingly, there exists a need to provide a more aesthetically appealing instrument panel.

SUMMARY OF THE INVENTION

The present invention provides an aesthetically appealing instrument panel by including a number of switches which are visible only when illuminated by an illumination source. The switches are thus generally concealed such that an area proximate the switch on a surface of the instrument panel appears to be uninterrupted by the switch.

The switch can be a membrane switch which requires a mechanical contact to actuate the switch. Preferably, the membrane switch includes an outer substrate that matches with the surface material of the instrument panel. The outer substrate is positioned flush with the instrument panel surface to conceal the switch by providing a substantially uninterrupted appearance.

The switch can also be a field effect switch which is actuated by disrupting an electric field. The field effect can be mounted behind the instrument panel to conceal the switch. Even though the field effect switch is behind the instrument panel, the electric field travels through the instrument panel to permit disruption and actuation.

The switches can also comprise part of an control panel. The control panel can include a plurality of the switches for attachment to the instrument panel. Once attached to the instrument panel, the switches can be used by an occupant in a passenger compartment to control features a vehicle or other controllable systems.

An illumination source is provided for selectively illuminating the switches. The switches are only visible to the occupant when illuminated by the illumination source. In this manner, the switches (membrane or field effect) are substantially hidden from the occupant unless illuminated. This provides an aesthetically appealing instrument pane.

The illumination source can be one or more illuminable icons. The illuminable icons can be part of a material substrate in the switch, such as a light emitting diode provided behind the icon and illuminated to illuminate the icon. A single switch can include multiple icons and multiple light emitting diodes to separately illuminate each icon.

The illumination source can also be a projector for projecting light onto the switches. The projected light can originate from a position in front of or behind the instrument panel. In either case, the light is projected onto or through to an outer surface of the instrument panel to selectively illuminate the switches. The projector can also project an additional image onto the surface of the instrument panel, preferably the additional image can act as a display for conveying information to the occupant.

The instrument panel system can further include a control module in communication with the control panel and the instrument panel for selectively interfacing the control panel with one or more vehicles systems to be controlled by the actuation of the switches. Preferably, the control module controls the illumination source to selectively illuminate the switches. For example, an actuation area that the user presses to actuate the switch can be increased by the control module assigning more than one switch to a single illumination source. Also, the control module can switch the illumination source functions such that the same switch can be used for multiple purposes.

BRIEF DESCRIPTION OF THE DRAWINGS

FIG. 7 illustrates an instrument panel system panel system having a projector for projecting light onto a plurality of switches in accordance with the present invention; and FIG. 8 illustrates the projector providing a display having an image portion and a switch portion in accordance with the present invention.

DETAILED DESCRIPTION OF THE PREFERRED EMBODIMENT(S)

Figure 1:
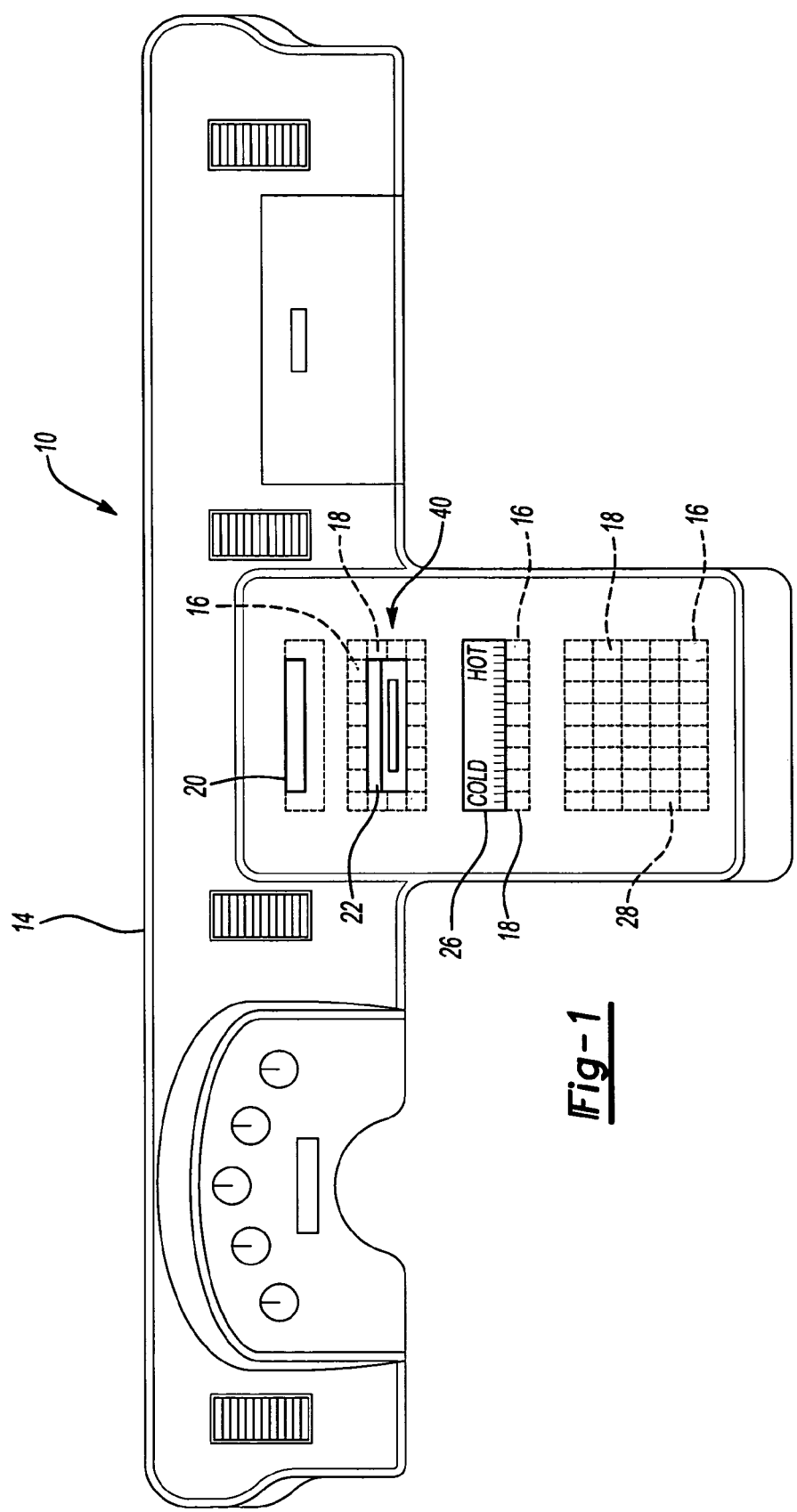
FIG. 1 illustrates an instrument panel system having switches which are visible only when illuminated by an illumination source in accordance with the present invention.

FIG. 1 illustrates an instrument panel system 10. The instrument panel system includes an instrument panel 14, a number of switches 16, a control module 20, a radio and compact disc player unit 22, an air control unit 26 and an array 28 of switches 16.

Each switch 16 includes a display 18. The switches 16 and displays 18 are shown in phantom to illustrate each is concealed from view unless illuminated. In this manner, the instrument panel 14 appears to be relatively uninterrupted by the switches 16. This provides a smooth and aesthetically pleasing instrument panel system 10.

The instrument panel system 10 shown relates to an automobile, however, the present invention is not limited to automobiles. The present invention applies to airplanes, boats, and other vehicles.

Figure 2:
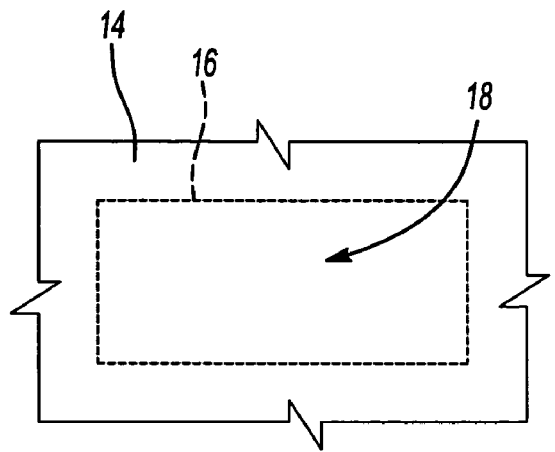
FIG. 2 illustrates an unilluminated switch in accordance with the present invention.
Figure 3:
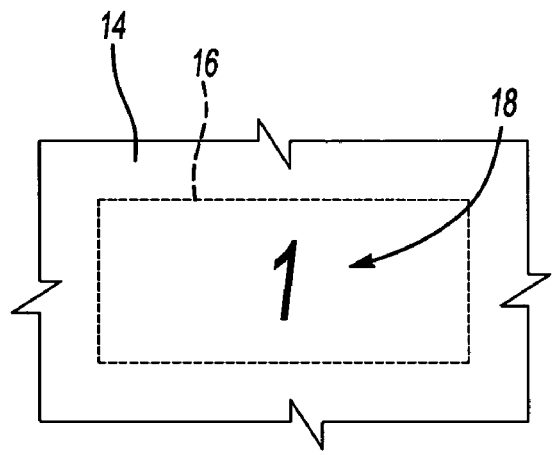
FIG. 3 illustrates an illuminated radio switch in accordance with the present invention.
Figure 4:
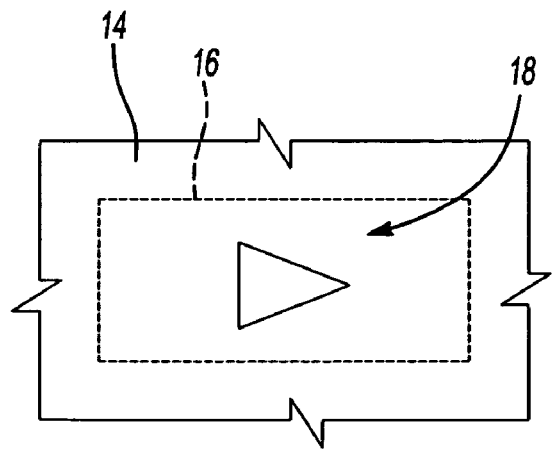
FIG. 4 illustrates an illuminated CD player switch in accordance with the present invention.

FIGS. 2-4 illustrate the operation of the switches 16. In particular, the figures provided an example how the control module 20 can control the use of the same switch 16 to provide a radio icon and a CD player icon for use with separate controls of the radio and CD unit 22.

In detail, FIG. 2 illustrates the display 18 as it appears to the passenger area when unilluminated. As shown, the switch 16 and the icon are concealed from view. FIG. 3 illustrates the display 18 if a radio icon is illuminated to select a radio station associated with number "1" button. FIG. 4 illustrates the illumination source if a CD icon is illuminated to select playing of a CD.

In this manner, various displays 18 are provided by the switches 16 around the radio and CD unit 22, similarly switches 16 can be provided around the air control unit 26. The displays 18 correspond with the available functions of the respective units 22, 26. Similarly, the array 26 of switches 16 can include any number of displays 18.

Figure 5:
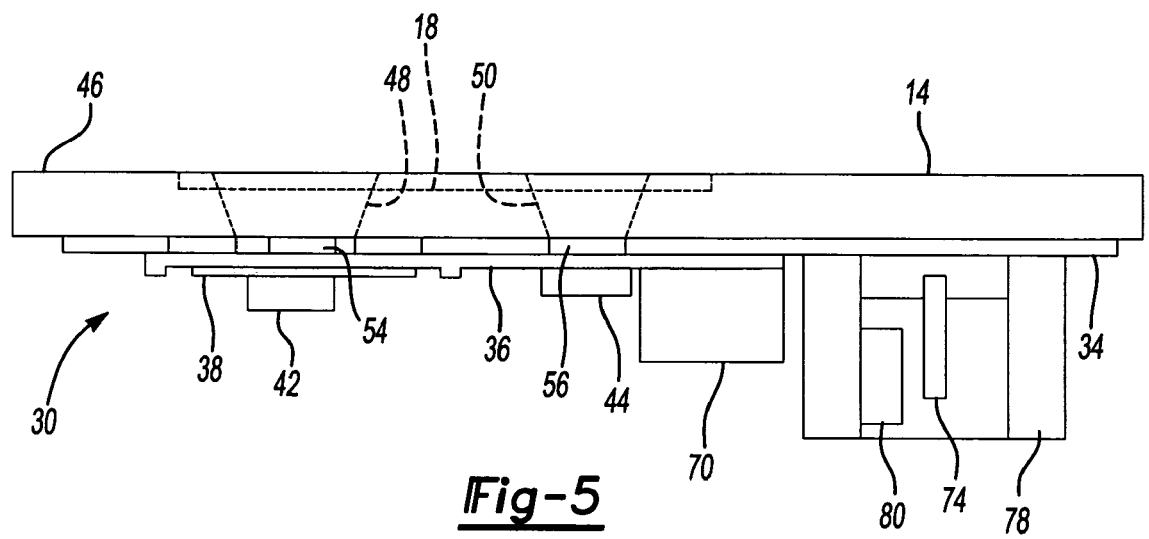
FIG. 5 illustrates a field effect switch in accordance with the present invention.

FIG. 5 illustrates the switch 16 comprising a field effect switch 30. The field effect switch 30 can provide the illumination sources shown in FIGS. 2-4. As shown in FIG. 1, a number of the field effect switches can comprises a control panel 40. The control panel 40 can then be attached to instrument panel and provided to be in communication with the radio and compact disc player unit 22.

The field effect switch 30 includes a support layer 34, a circuit board 36, and a touch cell 38 and can be actuated by disrupting an electric field produced by the touch cell 38. The disruption occurs by a user placing their finger relative to the electric field. The disruption is then interpreted by electronics on the circuit board 36.

The circuit board 36 communicates an actuation signal to the control module 20 if the disruption is sufficient for actuation. Typically, the period of disruption, the intensity, and the frequency are factors in determining whether the disruption is sufficient for actuation and whether the user desired to actuate the switch 30.

The display 18 is provided by an illumination source 42, 44 illuminating the switch 16. The illumination sources 42, 44 can be light emitting diodes. The display 18 is an image shown through to a surface 46 of the instrument panel 14 from light created by the light emitting diodes 42, 44.

The display 18 is needed to reveal the concealed switch 30 so that the user can locate and actuate the switch 30. Unless the switch 30 is illuminated, it is otherwise concealed from the user such that the switch 30 is viewed when the display is illuminated and concealed when the display is unilluminated.

The display 18 can comprise one or more illuminable icons images 48, 50. The illuminable icons images 48, 50 are images provide by icons 54, 56 in part of the support substrate 34. The light emitting diodes 42, 44 are provided behind each icon 54, 56 to illuminate the icon images 48, 50. As shown, one switch 30 can include multiple icons 54, 56 and multiple light emitting diodes 42, 44 to separately illuminate each icon image 48, 50.

The images provided by the support substrate 34 are transferred through the instrument panel 14 for display to the passenger compartment. The instrument panel 14 portion proximate the display 18 is a material suitable to pass light from the light emitting diodes 42, 44 to the passenger area while also concealing the icons 54, 56 when unilluminated.

The control module 20 controls which icon 54, 56 and which switch 18 is illuminated. In this manner, the control module 20 can vary the display 18 and the function indicated by the display 18, as shown in FIGS. 2-4. In addition, the control module 20 is provided to be in communication with the switches 16 which are arranged together to form the control panel 40 and the illumination source 42, 44 to selectively interface the control panel 40 with a vehicle system to be controlled by the switch 16. The control module 20 can thus selectively control illumination of the illumination source 42, 44 based on the vehicle system to be controlled.

Optionally, the field effect switch 30 can include a tone generator 70 and a tactile feel generator 74. One or both of these devices can be used as an actuation notification. The actuation notification is helpful to confirm that the switch was actuated.

The tone generator 70 is used to signal actuation of the switch 18 with an audible signal. The tactile feel generator 74 is used to signal actuation of the switch with a vibration or other signal which the user can feel.

A standoff 78 and a solenoid control circuit 80 can be included to facilitate operation of the tactile feel generator 74. The solenoid control circuit 80 controls the intensity and duration of the tactile feel signal and the standoff 78 is used to support the tactile feel generator away from the support layer.

Figure 6:
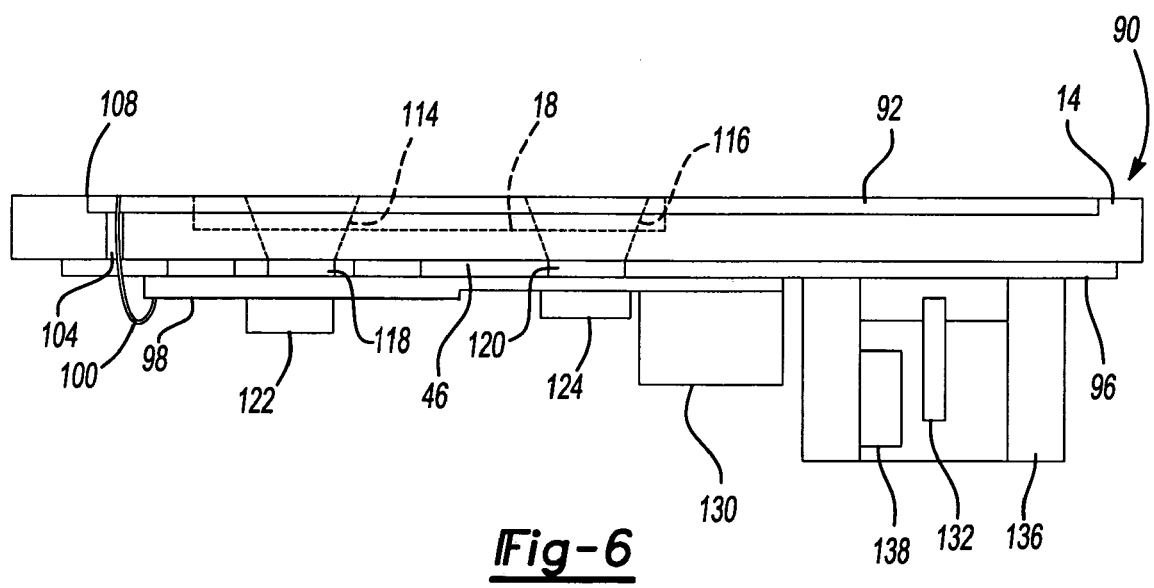
FIG. 6 illustrates a membrane switch in accordance with the present invention.

FIG. 6 illustrates the switch 16 comprising a membrane switch 90. The membrane switch 90 is concealed by its smooth fit to the instrument panel 14. The membrane switch 90 includes an outer substrate 92, a support substrate 96, a circuit board 98, a wire 100 connecting the outer substrate 92 to the circuit board 98, and a wire opening 104.

The outer substrate 92 is positioned flush with the instrument panel 14 to conceal the switch 90. The flush positioning provides a relatively smooth and uninterrupted fit between the instrument panel and the switch 90. In this manner, the aesthetic appearance of the instrument panel 12 is not negatively affected by the switch 10.

Slight grooves 108 may be seen upon close inspection. The grooves 108 can result from tolerancing differences between the switch 90 and in the relief in the instrument panel 14 required to accommodate the outer substrate 92. However, the grooves 108 are uninterruptive to the instrument panel 12 from an aesthetic point of view. In particular, the grooves 108 are aesthetically acceptable relative to the use of a relief, a bezel, a bracket, or some other fixture or protrusion which negatively interrupts the smoothness of the instrument panel.

The outer substrate 92 preferably matches the instrument panel 14 proximate the switch 90. This further increases the aesthetic appeal of the membrane switch 90. The outer substrate 92 material need not always match the instrument panel 14.

The membrane switch 90 is actuated by pressing against the outer substrate 92. This produces a change in the outer substrate 92 which induces a voltage change. The voltage change is registered by the circuit board 98 as actuation of the switch. Rather than inducing a voltage change, however, the switch 90 could include a push-button or other actuation means.

The membrane switch 90 includes the display 18 which operates in the same manner as described above with respect to the field effect switch and shown in FIGS. 2-4. In other words, the display 18 is illuminate by light emitting diodes 122, 124 to reveal the concealed membrane switch 90 so that the user can locate and actuate the switch 90. Unless the switch 90 is illuminated, it is otherwise concealed from the user such that the switch is viewed when the display is illuminated and concealed when the display is unilluminated.

Similarly, the display 18 can comprise one or more illuminable icon images 114, 116. The illuminable icon 118, 120 are part of the support substrate 96. The light emitting diodes 122, 124 are provide behind each icon 118, 120 to illuminate the icon images 114, 116. As shown, one switch can include multiple icons 118, 120 and multiple light emitting diodes 122, 124 to separately illuminate each icon 114, 116.

The display 18 provided by the membrane switch 90 is transferred through the instrument panel 14 and the outer substrate 92 for display to the passenger area. The instrument panel portion 14 and the outer substrate 92, therefore, are both materials suitable to pass light from the LED to the passenger area while also concealing the icon when unilluminated. This type of material is commonly referred to as a one-way light transmissible material.

The membrane switch 90 can also include a tone generator 130, a tactile feel generator 132, a standoff 136, and a solenoid control circuit 138. In addition, the control module controls which icon and which membrane switch 90 is illuminated. In this manner, the control module 20 can vary the display and the function corresponding with the display.

FIG. 7 illustrates an instrument panel system 150. Like the instrument panel system 10 shown in FIG. 1, the instrument panel system includes an instrument panel 152, a control panel 154 having one or more concealed switches 156, a display 158 for each switch 156 a control module 160, a radio and CD player unit 162, an air control unit 164, and an array 168 of switches 156. In addition, the instrument panel system includes a projector 172 as an illumination source positioned in front of the instrument panel.

The projector 172 is used for projecting light onto a surface of the instrument panel 152 to selectively illuminate the plurality of switches 156 by providing the displays 158. The switches can comprise either one or both of the field effect switch 30 and the membrane switch 90. The user actuates the switches 156 as described above.

The difference in instrument panel system 150 is that the displays 158 indicating the operation for the switches are 156 from the projector 172 and not the switch. Generally, the LEDs and icons are removed from the switches if the projector is used, but they need not be removed. In some cases, it may desirable to utilize the icons in combination with the projector to provide additional functionality and designability.

The projector 172 can project virtually any type of display onto the switches 156. It can produce display images similar to those provided by the icons or others. In addition, the size of the display 158 can be increased to cover multiple switches by simply adjusting the size of the projected display. This allows the control module 160 to adjust the size of the switch 156 perceived by the user without requiring hardware changes. For example, multiple switches in the array 168 can receive portions of the same display 158 to increase the size of the display from the user perspective.

As shown in FIG. 8, the projector 172 can also be configured to provide an additional display 174 having an image portion 176 and a switch portion 178. In this manner a information can be conveyed to the occupant, such as with a moving image or a global positioning image. In addition, the projector 172 is provided to be in communication with the control module 160 such that the projected light can be used to selectively illuminate the various switches 156 based on the vehicle system to be controlled.

The control module can also assign each switch 156 in the switch display portion 178 a function based on the images provide in the image portion. The available functions are shown by the displays 158 and could include adjusting contrast, positioning, or data entry relative to the video or global positioning image. The data entry could be achieve with the switch portion of the display providing an alphanumeric display. Alternatively, various icons could be display in the image portion to indicate available functions.

The variability of the projector is advantageous from a stylistic and design perspective as both the design and user can tailor the display to their needs without requiring hardware changes to the instrument panel. The use of the concealed switches is especially advantageous in that the non-used switches are concealed. This eliminates the problem of having to fill the openings with aesthetically undesirable blanks or plugs.

Alternatively, the projector could be positioned behind the instrument panel 152. The projected displays 158 would then have to travel through the switches 156 as described above. The switches include transparent or translucent portions, and in combination with light guides if necessary, which permit the projected image to pass through. The material of the instrument panel and the outer substrate of the membrane switch must also be selected to permit the image to be displayed while concealing the switch, as described above. The switch may include some opaque or non-transparent portions through which the image cannot pass. In compensation, the switches are arranged accordingly and the available display sizes and positioning are similarly limited.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a vehicle having a passenger compartment, an instrument panel system comprising:
    an instrument panel;
    a control panel attachable to the instrument panel, the control panel comprising a plurality of switches for use by an occupant in the passenger compartment to control at least one vehicle system;
    an illumination source for selectively illuminating at least one of the plurality of switches, wherein each of the plurality of switches is visible to the occupant only when illuminated by the illumination source;
    a control module in communication with the control panel and the illumination source, the control module for selectively interfacing the control panel with the at least one vehicle systems to be controlled, and for controlling the illumination source to selectively illuminate at least one of the plurality of switches based on the at least one of the plurality of vehicle systems to be controlled;
    wherein each of the plurality of switches comprises at least one icon for illumination by the illumination source; and
    wherein the at least one icon comprises a plurality of icons, each of the plurality of icons associated with one of a plurality of vehicle systems.

2. The instrument panel system of claim 1 wherein the illumination source comprises a projector for projecting light onto the plurality of switches.

3. The instrument panel system of claim 2 wherein the projector is to be located in the passenger compartment.

4. The instrument panel system of claim 2 wherein each of the plurality of switches is substantially transparent and the projector projects images onto the plurality of switches, the images visible to the occupant.

5. The instrument panel system of claim 3 wherein the projector projects images onto surfaces associated with the plurality of switches, the associated surfaces visible to the occupant.

6. The instrument panel system of claim 4 wherein the projector further projects an additional image onto a substantially transparent surface of the instrument panel, the substantially transparent surface of the instrument panel and the projected additional image acting as a display for conveying information to the occupant.

7. The instrument panel system of claim 4 wherein the projector further projects an additional image onto a substantially transparent surface of the control panel, the substantially transparent surface of the control panel and the projected additional image acting as a display for conveying information to the occupant.

8. The instrument panel system of claim 5 wherein the projector further projects an additional image onto a surface of the instrument panel visible to the occupant, the surface of the instrument panel and the projected additional image acting as a display for conveying information to the occupant.

9. The instrument panel system of claim 5 wherein the projector further projects an additional image onto a surface of the control panel visible to the occupant, the surface of the control panel and the projected additional image acting as a display for conveying information to the occupant.

10. The instrument panel system of claim 1 wherein the illumination source is a plurality of light emitting diodes in proximity to the plurality of switches.

11. The instrument panel system of claim 1 wherein each of the plurality of switches comprises a touch activated field effect switch.

12. The instrument panel system of claim 1 wherein each of the plurality of switches comprises a membrane switch.

13. The instrument panel system of claim 1 further comprising a control module to be provided in communication with the control panel and the illumination source, the control module for selectively interfacing the control panel with the at least one vehicle system to be controlled, and for controlling the illumination source to selectively illuminate at least one of the plurality of switches based on the at least one vehicle system to be controlled.

14. The instrument panel system of claim 1 wherein each of the plurality of switches comprises at least one icon for illumination by the illumination source, and wherein the control module selectively illuminates the at least one icon based on the at least one vehicle system to be controlled.

15. In a vehicle having a passenger compartment, an instrument panel system comprising:
    an instrument panel;
    a control panel attachable to the instrument panel, the control panel comprising a plurality of switches for use by an occupant in the passenger compartment to control a plurality of vehicle system, each of the plurality of switches having a plurality of icons associated therewith, each icon associated with one of the plurality of vehicle systems;
    an illumination source for selectively illuminating the plurality of icons, wherein each of the plurality of switches is visible to the occupant only when an associated icon is illuminated by the illumination source;
    a control module in communication with the control panel and the illumination source, the control module for selectively interfacing the control panel with at least one of the plurality of vehicle systems to be controlled, and for controlling the illumination source to selectively illuminate at least one of the plurality of icons based on the at least one of the plurality of vehicle systems to be controlled; and
    wherein at least two icons are associated with each switch and the control module controls which of the at least two icons is illuminated and the vehicle system controlled as function thereof.

16. The instrument panel of claim 15 wherein each of the plurality of switches includes an audible actuation notification to provide the occupant with an indication of actuation of the switch.

17. The instrument panel system of claim 15 wherein the illumination source is a projector for projecting light onto the plurality of switches.

* * * * *